United States Patent
Inoue (10) Patent No.: US 12,486,000 B2
(45) Date of Patent: Dec. 2, 2025

(54) BOAT INCLUDING A PLURALITY OF SETTABLE FUNCTIONS

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 193 days.

(21) Appl. No.: 18/102,114

(22) Filed: Jan. 27, 2023

(65) Prior Publication Data

US 2023/0264788 A1    Aug. 24, 2023

(30) Foreign Application Priority Data

Feb. 24, 2022    (JP) .................................. 2022-026630

(51) Int. Cl.

| | |
|---|---|
| *B63B 17/00* | (2006.01) |
| *B60K 35/10* | (2024.01) |
| *B60K 35/22* | (2024.01) |
| *B60K 35/29* | (2024.01) |

(Continued)

(52) U.S. Cl.
CPC .............. *B63B 17/00* (2013.01); *B60K 35/10* (2024.01); *B60K 35/22* (2024.01); *B60K 35/29* (2024.01); *B60K 35/50* (2024.01); *B60K 35/85* (2024.01); *B63B 2017/0009* (2013.01)

(58) Field of Classification Search
CPC . B63B 17/00; B63B 2017/0009; B63B 49/00; B60K 2360/197; B60K 2360/62; B60K 35/50; B60K 35/00; B60K 35/29; B60K 2028/003; B60K 28/00; B60R 2325/304; B60R 25/04; B63H 2021/216
See application file for complete search history.

(56) References Cited

U.S. PATENT DOCUMENTS

| | | | |
|---|---|---|---|
| 9,516,500 B2 * | 12/2016 | Ho ....................... | H04L 63/0428 |
| 2004/0135670 A1 * | 7/2004 | Guba ...................... | B60R 25/24 |
| | | | 340/5.21 |

(Continued)

FOREIGN PATENT DOCUMENTS

| | | |
|---|---|---|
| EP | 3 471 067 A1 | 4/2019 |
| JP | 2006-056336 A | 3/2006 |

(Continued)

OTHER PUBLICATIONS

Official Communication issued in corresponding European Patent Application No. 23152861.3, mailed on Nov. 14, 2023.

*Primary Examiner* — Rami Khatib (74) *Attorney, Agent, or Firm* — Keating & Bennett, LLP (57) ABSTRACT

At least a portion of a setting pattern of functions relating to a boat is automatically changed in response to execution of activation operations different from one another. The boat includes a controller configured or programmed to activate the boat by each of a plurality of different activation operations. When an activation operation of the activation operations satisfying a first condition is executed, the controller sets functions relating to the boat with the first setting pattern. When an activation operation not satisfying the first condition is executed, the controller sets functions relating to the boat with a second setting pattern having setting contents at least partially different from the first setting pattern.

14 Claims, 5 Drawing Sheets

(51) Int. Cl.
*B60K 35/50* (2024.01)
*B60K 35/85* (2024.01)

(56) References Cited

U.S. PATENT DOCUMENTS

| | | | |
|---|---|---|---|
| 2006/0040570 A1* | 2/2006 | Tsumiyama | B63B 34/10 |
| | | | 440/2 |
| 2015/0109099 A1* | 4/2015 | Birkel | G07C 9/00309 |
| | | | 340/5.6 |
| 2015/0355636 A1 | 12/2015 | Kataoka | |
| 2015/0356797 A1* | 12/2015 | McBride | G07C 9/29 |
| | | | 340/5.61 |
| 2016/0096610 A1 | 4/2016 | Suzuki et al. | |
| 2019/0217816 A1* | 7/2019 | Lee | H04W 4/40 |
| 2019/0268169 A1* | 8/2019 | Castillo | H04L 9/0869 |
| 2022/0281474 A1* | 9/2022 | Nakagawa | G07C 9/28 |
| 2024/0135006 A1* | 4/2024 | McFarland, Jr. | H04L 9/50 |

FOREIGN PATENT DOCUMENTS

| | | |
|---|---|---|
| JP | 2016-074247 A | 5/2016 |
| JP | 2016-074265 A | 5/2016 |

\* cited by examiner

| ACTIVATION OPERATION | SETTING PATTERN | PATTERN CHANGING FUNCTION |
|---|---|---|
| OPERATION WITH MASTER KEY KY1 | OWNER PATTERN P1 | VALID |
| OPERATION WITH SPARE KEY KY2 | GUEST PATTERN P2 | VALID |
| OPERATION WITH SMARTPHONE SP1 | STANDARD PATTERN P3 | INVALID |
| OPERATION WITH SMARTPHONE SP2 | | |
| ... | ... | ... |

FIG.5

BOAT INCLUDING A PLURALITY OF SETTABLE FUNCTIONS

CROSS REFERENCE TO RELATED APPLICATIONS

This application claims the benefit of priority to Japanese Patent Application No. 2022-026630 filed on Feb. 24, 2022. The entire contents of this application are hereby incorporated herein by reference.

BACKGROUND OF THE INVENTION

1. Field of the Invention

The technology disclosed herein relates to a boat.

2. Description of the Related Art

Conventionally, there has been known a boat equipped with a display unit having, e.g., a touch panel function and displaying various operation images for operating the boat (see, e.g., Japanese Unexamined Patent Application Publication No. 2016-74247).

There are cases in which a boat is used by several different users, e.g., the owner of the boat lends the boat to a guest. The display unit of the conventional boat always displays an operation image of the same content regardless of who the user is. In other words, the operation image cannot be changed according to the users, so that there is room for improvement in the convenience of the boat when a plurality of users use the boat.

SUMMARY OF THE INVENTION

Preferred embodiments of the present invention disclose technologies that are able to solve the above-described problems.

Preferred embodiments of the present invention may be implemented in the following aspects.

According to a preferred embodiment of the present invention, a boat includes a controller configured or programmed to activate the boat by each of a plurality of activation operations different from one another, and when an activation operation of the plurality of activation operations satisfying a first condition is executed, set functions relating to the boat with a first setting pattern. When an activation operation not satisfying the first condition is executed, the controller sets functions relating to the boat with a second setting pattern having setting contents at least partially different from the first setting pattern.

The boat is able to automatically change at least a portion of a setting pattern of functions relating to the boat in response to execution of activation operations different from one another.

According to a preferred embodiment of the present invention, the plurality of activation operations may include an operation with a master key and an operation with a spare key. The first condition may include an operation with the master key as a necessary condition. The boat is able to automatically change at least a portion of the setting pattern of the functions relating to the boat based on the determination of the key executing the activation operation without requiring, e.g., a password input operation.

According to a preferred embodiment of the present invention, the plurality of activation operations may include an operation with a key and an operation with a mobile communication terminal. The first condition may include an operation with the key as a necessary condition. The boat is able to automatically change at least a portion of the setting pattern of the functions relating to the boat based on whether the activation operation is a key operation without requiring, e.g., a password input operation.

According to a preferred embodiment of the present invention, the plurality of activation operations may include an operation with a mobile communication terminal satisfying the second condition and an operation with a mobile communication terminal not satisfying the second condition. The first condition may include the operation with the mobile communication terminal satisfying the second condition as a necessary condition. The boat is able to automatically change at least a portion of the setting pattern of the functions relating to the boat based on whether the operation is performed by the mobile communication terminal satisfying a predetermined condition without requiring a direct input operation to a steering device.

According to a preferred embodiment of the present invention, at least some of the functions enabled in the first setting pattern may be disabled in the second setting pattern. The boat is able to limit the usage authorization of the functions relating to the boat in response to execution of activation operations different from one another.

According to a preferred embodiment of the present invention, the boat may further include a display. The functions relating to the boat may include a display function to display information relating to the boat on the display. At least a portion of the information that is displayable on the display by the display function in the first setting pattern may be non-displayable by the display function in the second setting pattern. The boat is able to limit the display function of the boat in response to execution of activation operations different from one another.

According to a preferred embodiment of the present invention, the boat may further include a storage. The functions relating to the boat may include a pattern changing function to change a setting pattern of the functions relating to the boat. The controller may be configured or programmed to store a setting pattern changed by the pattern changing function in the storage in at least one of a case where an activation operation satisfying the first condition is executed and a case where an activation operation not satisfying the first condition is executed. When the same activation operation as that at the time of the change by the pattern changing function is re-executed, the functions relating to the boat may be set with the changed setting pattern stored in the storage. By storing the setting pattern changed by the pattern changing function, the boat is able to reuse the setting pattern after the change without requiring an operation to change the setting again when the same activation operation is re-executed.

According to a preferred embodiment of the present invention, when at least two activation operations different from one another are executed, the controller is configured or programmed to store the changed setting patterns in the storage in association with each of the at least two activation operations. By storing the changed setting patterns for at least two different activation operations, the boat is able to reuse the changed setting pattern without requiring an operation to change the setting again when the same activation operation is re-executed for each of the activation operations.

The technology disclosed herein may be implemented in various aspects, including, e.g., a boat, a controller or display provided on the boat, a method for setting functions relating to the boat, and a non-transitory computer-readable medium including a computer program for implementing the functions of these devices or corresponding methods, among other aspects.

According to a preferred embodiment the present invention, it is possible to automatically change at least a portion of the setting pattern of functions relating to the boat in response to execution of activation operations different from one another.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
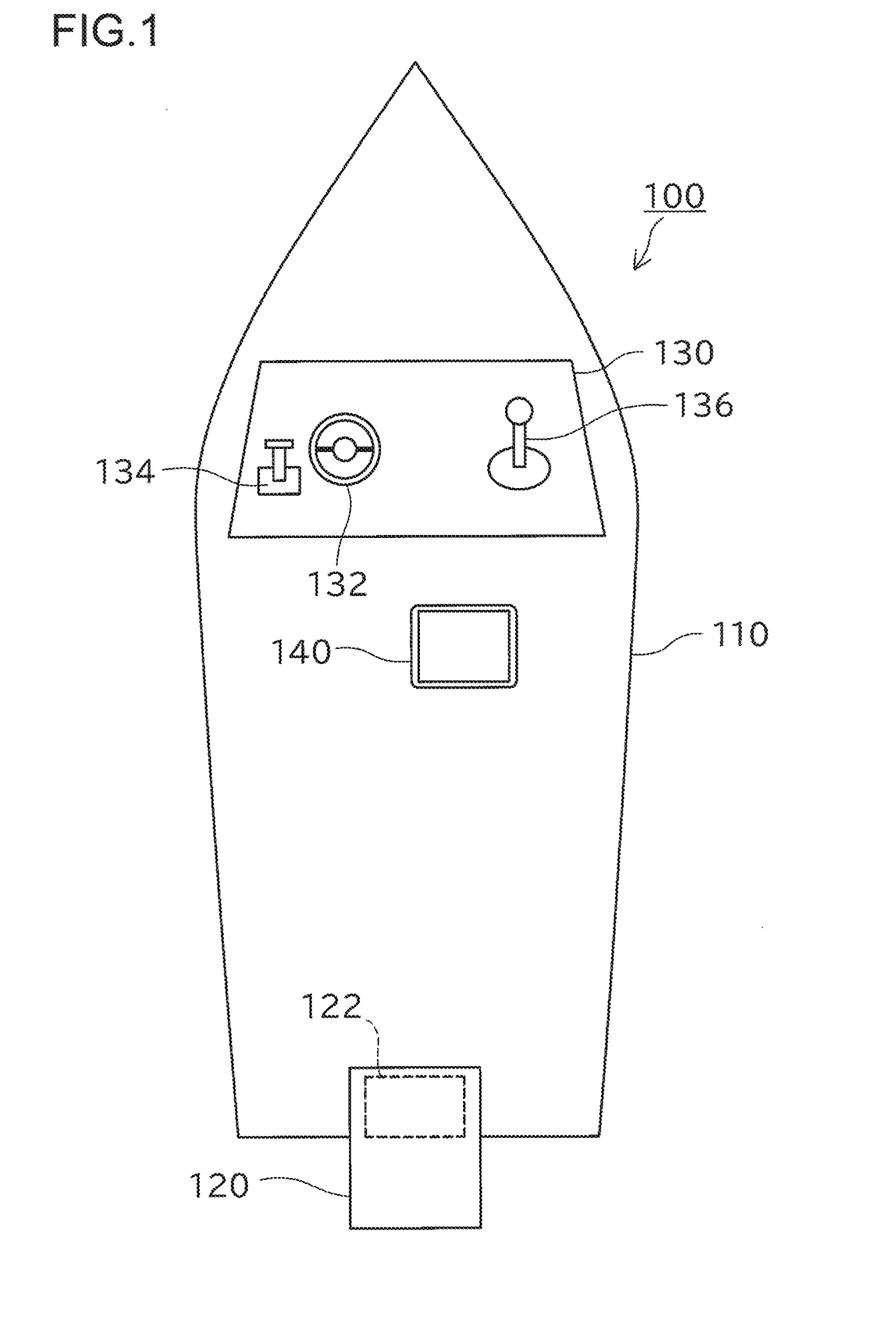
FIG. 1 is a top view schematically illustrating a configuration of a boat in a preferred embodiment of the present invention.

FIG. 1 is a top view schematically illustrating a configuration of a boat 100 according to a preferred embodiment of the present invention. As shown in FIG. 1, the boat 100 includes a hull 110, an outboard motor 120, a steering device 130, and a display unit 140. The outboard motor 120 is provided at the rear of the hull 110. The outboard motor 120 includes, e.g., a power source 122 such as an engine, and a propeller (not shown) to propel the hull 110. The steering device 130 includes a steering wheel 132, a remote control 134, and a joystick 136. The driver of the boat 100 steers the hull 110 by operating the steering wheel 132, adjusts the shift state and output (throttle opening) of the outboard motor 120 by operating the remote control 134, and moves the hull 110 by operating the joystick 136.

Figure 2:
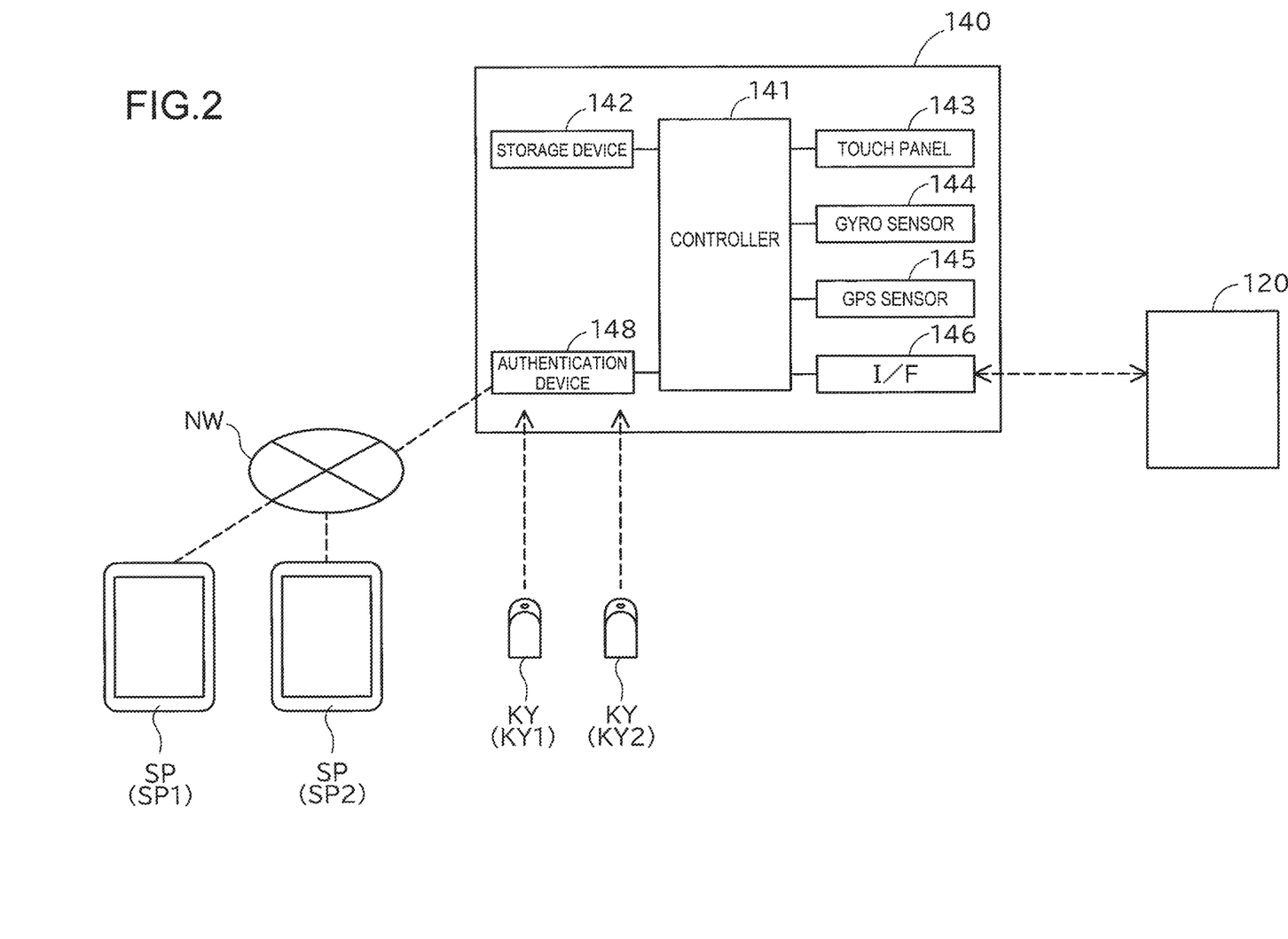
FIG. 2 is a block diagram schematically illustrating a display unit provided on the boat.

FIG. 2 is a block diagram schematically illustrating the display unit 140 provided on the boat 100. The display unit 140 includes a controller 141 and a storage device 142. The controller 141 sets various functions relating to the boat and controls the outboard motor 120, for example. The controller 141 includes, e.g., a CPU, a multi-core CPU, and a programmable device (field programmable gate array (FPGA), and programmable logic device (PLD), among others). The storage device 142 includes, e.g., a ROM, a RAM, and a hard disk drive (HDD). The storage device 142 stores various programs and data, and is used as a work area and a data storage area to execute various processes. For example, the storage device 142 stores a computer program to execute a function setting process to be described below. This computer program is stored in a computer-readable recording medium (not shown) such as a CD-ROM, a DVD-ROM, or a USB memory, and is stored in the storage device 142 by being installed in the display unit 140.

Figure 3:
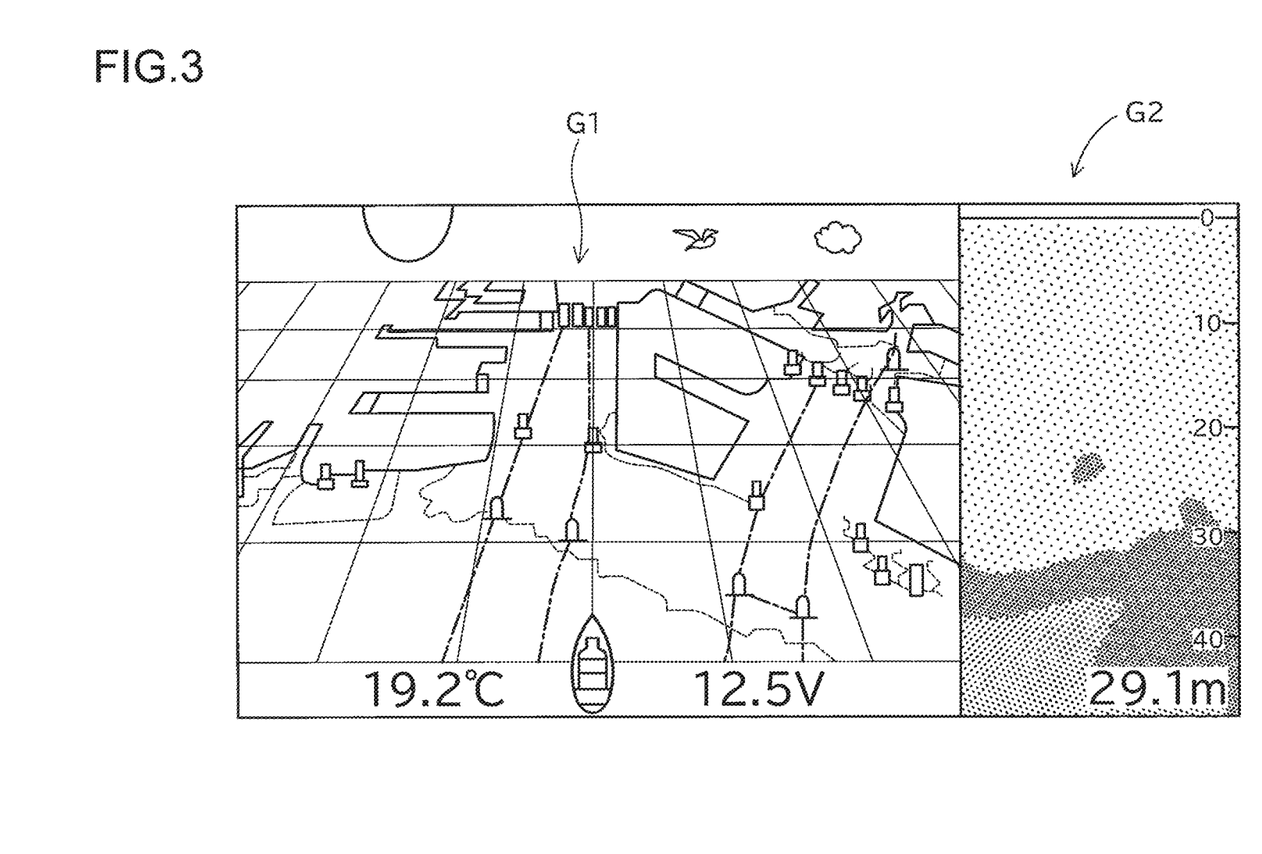
FIG. 3 is a schematic view illustrating an example of an image displayed on the display unit.

The display unit 140 further includes a touch panel 143. The touch panel 143 is a display device having a touch sensing display screen, and displays various images (e.g., a screen image for operation) relating to the boat 100 and allows input operations on the display screen. FIG. 3 is a schematic view illustrating an example of an image displayed on the display unit 140. FIG. 3 shows a navigation image G1 and a fish finding function image G2. The navigation image G1 displays a map showing the present position of the boat 100. The fish finding function image G2 displays the position of a fish group in the water below the boat 100 as fish group information. The touch panel 143 is an example of the display device.

The display unit 140 further includes a gyro sensor 144, a GPS (global positioning system) sensor 145, and an interface (I/F) 146. The controller 141 acquires the attitude and current position of the boat 100 according to respective detection signals of the gyro sensor 144 and the GPS sensor 145. The interface 146 communicates with each device (outboard motor 120 and steering device 130, among others) of the hull 110 via wired or wireless communication.

The display unit 140 further includes an authentication device 148. The authentication device 148 determines whether the activation operation executed by the user of the boat 100 (hereinafter referred to as "execution operation") satisfies a predetermined authentication condition. The boat 100 is activated by a plurality of activation operations different from one another. The authentication device 148 provides authentication permission (success) to a plurality of activation operations different from one another. The boat 100 is activated, e.g., the outboard motor 120 is operable in response to the authentication permission.

The plurality of activation operations different from one another may include a plurality of activation operations that are different in their operation, for example (1) to (3) below.
(1) Operation with a Key The authentication device 148 includes, e.g., an immobilizer function and performs authentication by collating a key ID transmitted from a key KY (KY1 and KY2 in FIG. 2) with IDs registered in advance.
(2) Operation with a Mobile Communication Terminal The authentication device 148 includes a communication function such as a DCM (data communication module) to communicate with an external device. The authentication device 148 performs authentication with regard to the identification information (e.g., a user ID and a password) transmitted from a mobile communication terminal such as a smartphone SP (SP1 and SP2 in FIG. 2) via a network line NW. The authentication device 148 may acquire identification information from a mobile communication terminal via a LAN (local area network) by using Wi-Fi (registered trademark) or the like.
(3) Operation with an Input Device (e.g., Console) Provided on the Boat 100

The authentication device 148 performs authentication by collating a unique information input by an input operation to the touch panel 143 of the display unit 140 with reference information registered in advance. The unique information is, e.g., a password or human body information such as a fingerprint or a face.

The plurality of activation operations different from one another may further include a plurality of activation operations having the same way of operation and different unique information (e.g., identification information of an operator) used for the activation operation, as in (4) and (5) below.
(4) In the Case of Operation with a Key The authentication device 148 stores a plurality of mutually different registration IDs corresponding to a plurality of keys KY1, KY2, and performs authentication according to whether a key ID transmitted from each key KY matches any one of the plurality of registration IDs.

(5) In the Case of Operation with a Mobile Communication Terminal

The authentication device 148 is configured to provide authentication permission for a plurality of mutually different identification information, and performs authentication based on the identification information transmitted from each of the plurality of smartphones SP1, SP2.

The function setting process is a process for setting functions relating to the boat 100 with one of several patterns different from one another.

The setting patterns different from one another may include at least one of the following setting patterns (1) to (4), for example.

(1) Setting Patterns Relating to the Display Function of the Display Unit 140

Setting patterns in which the display layouts of images displayed on the display unit 140 are different from one another (e.g., the layout difference in the navigation image G1 and the fish finding function image G2 shown in FIG. 3).

Setting patterns in which the display of specific information in each image are different from one another (e.g., the difference in display items such as water depth in the fish finding function image G2 shown in FIG. 3, the presence or absence of the display of fishing points in the navigation image G1 (map information), and the presence or absence of the display of past trajectories (detection results of GPS) of the boat 100, among others).

(2) Setting Patterns Relating to the Steering Function of the Boat 100

For example, in an autopilot (automatic pilot) function, at least one of the following settings are different from one another.

Setting patterns in which the presence or absence of the setting of a course maintenance mode (a mode which automatically adjusts the influence of wind and current to maintain the boat course) are different from one another.

Setting patterns in which the final destination in a track point mode (a mode which navigates the boat to a final destination via points designated in advance) are different from one another.

Setting patterns in which the presence or absence of the setting of an azimuth maintenance mode (a mode which keeps navigation by maintaining azimuth with respect to wind and current) are different from one another.

Setting patterns in which the angle and distance settings of a pattern steering mode (a mode which navigates the boat at a set angle or distance such as in zigzag or spiral pattern) are different from one another.

(3) Setting Patterns Relating to the Fish Finding Function

Setting patterns in which thresholds of fish sizes to be detected are different from one another.

Setting patterns in which thresholds of hardness (density) to be judged of the sea bottom are different from one another.

(4) Setting Patterns Relating to Usage Authorization of Functions

For example, setting patterns in which the usage authorization of each function are different from one another as follows.

Setting patterns in which the presence or absence of the authorization to change settings of the autopilot function and the fish finding function are different from one another.

Setting patterns in which the available modes in the autopilot function are different from one another.

Setting patterns in which the presence or absence of the authorization for browsing setting contents of the autopilot function and the fish finding function are different from one another.

For example, when the user of the boat 100 performs an execution operation, the authentication device 148 determines whether the execution operation satisfies the authentication condition to permit the activation of the outboard motor 120. In the following description, it is assumed that the authentication condition corresponds to one of the following activation operations (see FIG. 2).

Operation with the master key KY1.
Operation with the spare key KY2.
Operation with the smartphone SP (SP1, SP2) based on the identification information matching the pre-registered identification information.

It should be noted that number of the spare keys KY2 and the smartphones SP may each be one or more.

Figure 4:
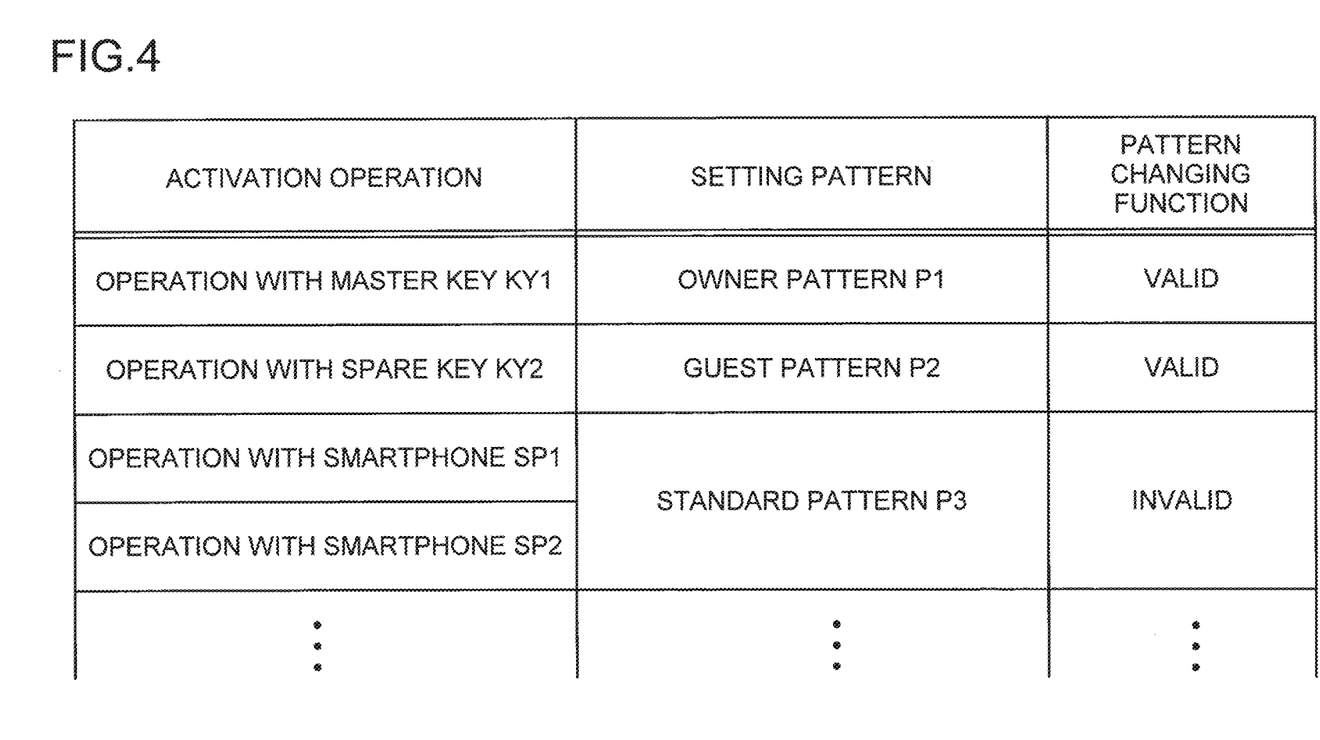
FIG. 4 is an explanatory diagram illustrating an example of a table of activation operations, setting patterns, and pattern changing functions.

FIG. 4 is an explanatory diagram showing an example of a table of activation operations, setting patterns, and pattern changing functions. The storage device 142 stores a table of activation operations, setting patterns, and pattern changing functions. This table shows correspondence between each of the plurality of activation operations able to activate the boat 100 and the setting patterns of functions relating to the boat 100, as well as whether the pattern changing function is valid or invalid for each of the setting patterns.

As shown in FIG. 4, for the operation with the master key KY1, the pattern changing function is valid, and the owner pattern P1 is associated with this operation. For the operation with the spare key KY2, the pattern changing function is valid, and the guest pattern P2 is associated with this operation. For the operation with the smartphone SP (SP1, SP2), the pattern changing function is invalid, and the standard pattern P3 is associated with this operation. The owner pattern P1, the guest pattern P2, and the standard pattern P3 differ from one another in at least some of the setting contents. For example, the owner pattern P1 is a pattern that permits using and changing of all functions for the boat 100. The guest pattern P2 is a pattern in which using and changing some of the functions relating to the boat 100 are limited as compared with the owner pattern P1. The standard pattern P3 is a pattern in which using and changing of the functions relating to the boat 100 are further limited as compared with the guest pattern P2.

The pattern changing function is a function for changing the setting pattern of the functions relating to the boat 100. When the pattern changing function is valid, the user has the right to change the setting pattern, and when the pattern changing function is invalid, the user does not have the right to change the setting pattern.

Figure 5:
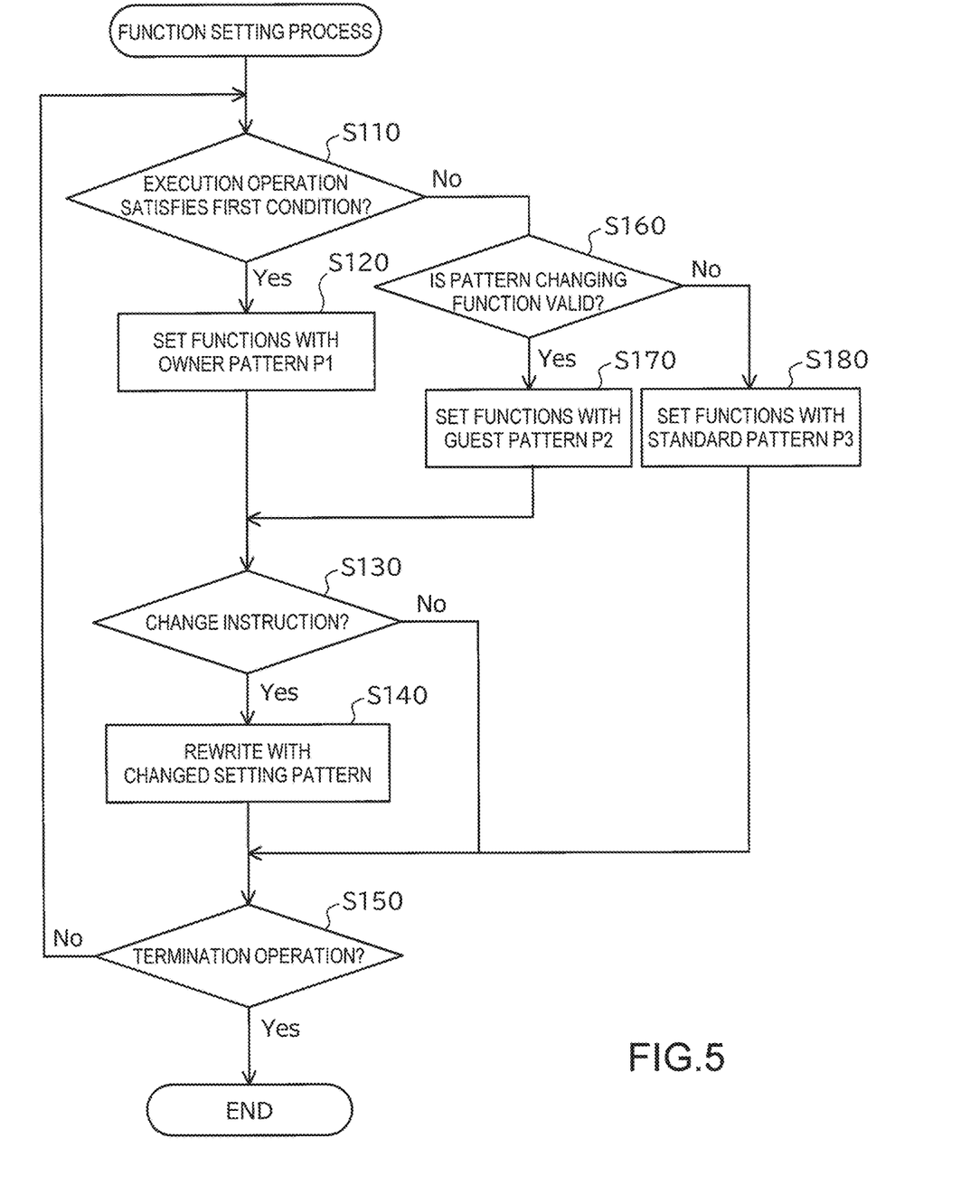
FIG. 5 is a flowchart illustrating a function setting process.

Upon determining that the execution operation satisfies the authentication condition, the authentication device 148 transmits the authentication result to the display unit 140. When the display unit 140 receives the authentication result, the controller 141 executes the function setting process. FIG. 5 is a flowchart illustrating the function setting process.

As shown in FIG. 5, the controller 141 determines whether the execution operation satisfies the first condition (S110). In the present preferred embodiment, the first condition includes as an essential condition that the operation is performed by the master key KY1. The authentication result transmitted from the authentication device 148 includes operation related information (e.g., identification information for the key KY and smartphone SP) indicating which activation operation has been executed. Therefore, the controller 141 is able to determine which activation operation has been executed based on the authentication result.

If the controller 141 determines that the operation with the master key KY1 has been executed (S110: YES), the controller 141 refers to the table (FIG. 4) and sets functions relating to the boat 100 with the owner pattern P1 (S120). In other words, in the present preferred embodiment, the operation with the master key KY1 is regarded as the activation operation by the owner of the boat 100, and the functions relating to the boat 100 is set with the owner pattern P1. The owner pattern P1 is an example of the first setting pattern.

On the other hand, if the controller 141 determines that an activation operation different from the operation with the master key KY1 (operation with the spare key KY2 or the smartphone SP) has been executed (S110: YES), the controller 141 refers to the table (FIG. 4) and determines whether the pattern changing function is valid for the execution operation (S160). For example, if the controller 141 determines that the operation with the spare key KY2 has been executed based on the authentication result from the authentication device 148, the controller 141 determines that the pattern changing function is valid (S160: YES). On the other hand, if the controller 141 determines that the operation with the smartphone SP (SP1, SP2) has been executed based on the authentication result, the controller 141 determines that the pattern changing function is invalid (S160: NO).

If the controller 141 determines that the pattern changing function is valid (S160: YES), the controller 141 sets functions relating to the boat 100 with the guest pattern P2 (S170). The guest pattern P2 is an example of the second setting pattern.

If the owner pattern P1 or the guest pattern P2 is set (S120, S170), the controller 141 determines whether there is a change instruction (S130). In the operation with the key KY (KY1, KY2), since the pattern changing function is valid (see FIG. 4), the setting contents of the setting pattern are able to be changed. For example, when an operation to change the setting contents of the setting pattern is executed through the touch panel 143 of the display unit 140, the controller 141 determines that there is a change instruction. If the controller 141 determines that there is a change instruction (S130: YES), the controller 141 stores the changed setting pattern in the storage device 142 (S140), and proceeds to the process of S150.

For example, if there is a change instruction (S130: YES) after the operation with the master key KY1 (S110: YES), the owner pattern P1 stored in the table (FIG. 4) is overwritten by the changed setting pattern. If there is a change instruction (S130: YES) after the operation with the spare key KY2 (S110: NO and S160: YES), the guest pattern P2 stored in the table is overwritten by the changed setting pattern.

On the other hand, if the controller 141 determines that there is no change instruction (S130: NO), the controller 141 does not execute the process of S140 and proceeds to the process of S150. If the controller 141 determines in S160 that the pattern changing function is invalid (S160: NO), the controller 141 sets functions relating to the boat 100 with the standard pattern P3 (S180), and proceeds to the process of S150. The standard pattern P3 is an example of the second setting pattern.

In S150, if the termination operation is not performed (S150: NO), the controller 141 returns to the process of S110, and if the termination operation is performed (S150: YES), the controller 141 ends the function setting process. The termination operation is an exit operation with the key in an operation with the key KY or receiving of an exit command from the smartphone SP in an operation with the smartphone SP.

As described above, the boat 100 of the present preferred embodiment is provided with the controller 141. The controller 141 activates the boat 100 by each of a plurality of activation operations different from one another (see FIGS. 2 and 4). When an activation operation of the plurality of activation operations satisfying the first condition is executed (S110: YES), the controller 141 sets the functions relating to the boat 100 with the owner pattern P1 (S120). On the other hand, when an activation operation which does not satisfy the first condition is executed (S110: NO), the controller 141 sets the functions relating to the boat 100 with the guest pattern P2 or the standard pattern P3 having setting contents at least partially different from those of the owner pattern P1 (S170 and S180). Thus, at least some of the setting patterns of the functions relating to the boat 100 are able to be automatically changed in response to execution of activation operations different from one another. Further, changing the setting pattern according to the difference of the operation essential for the operation of the boat 100, i.e., the activation operation of the boat will eliminate the necessity of a dedicated operation to change the setting pattern.

For example, the fishing point or the past trajectory of the boat 100 recorded during the setting with the owner pattern P1 may not be displayed on the display unit 140 during the setting with the guest pattern P2 or the standard pattern P3. Thus, it is possible to prevent the guest from knowing the fishing point or the like stored by the owner. As described above, the display function of the boat 100 is able to be limited in response to execution of activation operations different from one another. The owner pattern P1, the guest pattern P2, and the standard pattern P3 may be different from one another in terms of disclosure conditions, disclosure timing, and disclosure range of specific information such as fishing points.

In a preferred embodiment of the present invention, if the controller 141 determines that an operation with the master key KY1 is executed (S110: YES), the controller 141 sets functions relating to the boat 100 with the owner pattern P1 (S120). On the other hand, if the controller 141 determines that an operation with an item other than the master key KY1 is executed (S110: NO), the controller 141 sets functions relating to the boat 100 with the guest pattern P2 or the standard pattern P3 (S120). Thus, at least some of the setting patterns of the functions relating to the boat 100 are able to be automatically changed according to the determination of the key for performing the activation operation without requiring an input operation such as a password inputting operation.

In a preferred embodiment of the present invention, at least some of the functions available in the owner pattern P1 are disabled in the guest pattern P2 and the standard pattern P3. Specifically, in the setting of the standard pattern P3, the pattern changing function is disabled (see FIG. 4). In the guest pattern P2, e.g., some functions of the autopilot function are disabled. This limits the usage authorization of the functions relating to the boat 100 in response to execution of activation operations different from one another.

In a preferred embodiment of the present invention, in the function setting process shown in FIG. 5, the changed setting pattern is stored in the storage device 142 (S140), and this function setting process ends. Thereafter, when the same activation operation as that at the time of change by the pattern changing function is re-executed, the controller 141 sets the functions relating to the boat 100 with the changed setting pattern stored in the storage device 142. For example, it is assumed that an operation with the master key KY1 is executed (S110: YES), the owner pattern P1 is changed (S140), and the function setting process is completed. Thereafter, when the operation with the master key KY1 is re-executed (S110: YES), the functions relating to the boat 100 are set with the changed owner pattern P1. Since the setting pattern after the change by the pattern changing function is stored in this way, when the same activation operation is re-executed, the setting pattern after the change is able to be reused without requiring an operation for changing the setting again.

In a preferred embodiment of the present invention, when the operation with the master key KY1 and the operation with the spare key KY2 are executed, the changed setting pattern is stored in the storage device 142 in association with each of the activation operations (S140). Thus, when the same activation operation is re-executed for each of the activation operations, the changed setting pattern is able to be reused without requiring an operation for changing the setting again.

The technology disclosed herein is not limited to the above-described preferred embodiments, and can be modified into various forms without departing from the spirit thereof, e.g., the following modifications are also possible.

The structure of the boat 100 and the display unit 140 in the above preferred embodiments are merely examples and can be modified in various ways. For example, although the display unit 140 executes the function setting process in the above preferred embodiments, a control device having no display function and having at least the controller 141 and the storage device 142 may execute the function setting process. The display unit 140 is not limited to a touch panel, and may be configured such that a display screen and an operational keyboard or the like are provided separately. Although the authentication device 148 is provided separately from the controller 141 in the above preferred embodiments, the controller 141 may have the authentication function (e.g., immobilizer or DCM) of the authentication device 148.

Although the activation operation activates the outboard motor 120 of the boat 100 in the above preferred embodiments, each electrical component (e.g., steering device 130 and display unit 140) of the boat 100 may be activated (brought into an operable state). In the above preferred embodiments, operation of the boat 100 by the smartphone SP may be disabled.

The contents of the function setting process in the above preferred embodiments are only examples, and can be modified in various ways. For example, in the process of S110 of the function setting process shown in FIG. 5, the first condition may be an operation with the key KY. In this case, the controller 141 may set functions relating to the boat 100 with the owner pattern P1 in response to the operation with either the master key KY1 or the spare key KY2.

In the above preferred embodiments, the boat 100 may not be operated by the key KY, and the first condition may be an operation with the smartphone SP1 corresponding to the specific information of a predetermined user (e.g., owner). With this configuration, e.g., at least a portion of the setting pattern of the functions relating to the boat 100 are able to be automatically changed according to whether the operation is performed by the smartphone SP satisfying a predetermined condition without requiring a direct input operation to the steering device 130 of the boat 100. The operation corresponding to specific information of a predetermined owner is an example of the second condition.

In the above preferred embodiments, even when the operation with the smartphone SP (SP1, SP2) is executed, the pattern changing function may be enabled so that the changed setting pattern is stored in the storage device 142.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A boat comprising:
   a storage;
   at least two of (1) one or more keys, (2) one or more mobile communication terminals, and (3) one or more unique information operations on an input of the boat, each of the one or more keys, the one or more mobile communication terminals, and the one or more unique information operations on the input including an activation operation different from one another; and
   a controller configured or programmed to:
      activate the boat by one of the activation operations;
      when the one activation operation satisfying a first condition is executed, set functions relating to the boat with a first setting pattern; and
      when the one activation operation not satisfying the first condition is executed, set functions relating to the boat with a second setting pattern having setting contents at least partially different from the first setting pattern; wherein
   the functions relating to the boat include a pattern changing function to change the first setting pattern or the second setting pattern; and
   the controller is configured or programmed to:
      store a changed setting pattern changed by the pattern changing function in the storage in at least one of a case where the activation operation satisfying the first condition is executed and a case where the activation operation not satisfying the first condition is executed; and
      when the same activation operation as that at the time of the change by the pattern changing function is re-executed, set the functions relating to the boat with the changed setting pattern stored in the storage.

2. The boat according to claim 1, wherein
   the at least two of (1) one or more keys, (2) one or more mobile communication terminals, and (3) one or more unique information operations on an input of the boat include a master key and a spare key; and
   the first condition includes the activation operation with the master key.

3. The boat according to claim 1, wherein
   the at least two of (1) one or more keys, (2) one or more mobile communication terminals, and (3) one or more unique information operations on an input of the boat include a key and a mobile communication terminal; and
   the first condition includes the activation operation with the key.

4. The boat according to claim 1, wherein
   the at least two of (1) one or more keys, (2) one or more mobile communication terminals, and (3) one or more unique information operations on an input of the boat include a mobile communication terminal satisfying a second condition; and the first condition includes the activation operation with the mobile communication terminal satisfying the second condition.

5. The boat according to claim 1, wherein at least some of the functions enabled in the first setting pattern are disabled in the second setting pattern.

6. The boat according to claim 1, wherein
the functions relating to the boat include a display function to display information relating to the boat on a display; and
at least a portion of the information that is displayable on the display by the display function in the first setting pattern is made non-displayable by the display function in the second setting pattern.

7. The boat according to claim 1, wherein, when at least two activation operations different from one another are executed, the controller is configured or programmed to store the changed setting pattern in the storage in association with each of the at least two activation operations.

8. A method for operating a boat, the method comprising:
providing at least two of (1) one or more keys, (2) one or more mobile communication terminals, and (3) one or more unique information operations on an input of the boat, each of the one or more keys, the one or more mobile communication terminals, and the one or more unique information operations on the input including an activation operation different from one another;
activating the boat by one of the activation operations;
when the one activation operation satisfying a first condition is executed, setting functions relating to the boat with a first setting pattern; and
when the one activation operation not satisfying the first condition is executed, setting functions relating to the boat with a second setting pattern having setting contents at least partially different from the first setting pattern; wherein
the functions relating to the boat include a pattern changing function to change the first setting pattern or the second setting pattern; and
the method further comprises:
storing a changed setting pattern changed by the pattern changing function in at least one of a case where the activation operation satisfying the first condition is executed and a case where the activation operation not satisfying the first condition is executed; and
when the same activation operation as that at the time of the change by the pattern changing function is re-executed, setting the functions relating to the boat with the changed setting pattern as stored.

9. The method for operating a boat according to claim 8, wherein
the at least two of (1) one or more keys, (2) one or more mobile communication terminals, and (3) one or more unique information operations on an input of the boat include a master key and a spare key; and
the first condition includes the activation operation with the master key.

10. The method for operating a boat according to claim 8, wherein
at least two of (1) one or more keys, (2) one or more mobile communication terminals, and (3) one or more unique information operations on an input of the boat include a key and a mobile communication terminal; and
the first condition includes the activation operation with the key.

11. The method for operating a boat according to claim 8, wherein
the at least two of (1) one or more keys, (2) one or more mobile communication terminals, and (3) one or more unique information operations on an input of the boat include a mobile communication terminal satisfying a second condition; and
the first condition includes the activation operation with the mobile communication terminal satisfying the second condition.

12. The method for operating a boat according to claim 8, wherein at least some of the functions enabled in the first setting pattern are disabled in the second setting pattern.

13. The method for operating a boat according to claim 8, wherein
the functions relating to the boat include a display function to display information relating to the boat on a display; and
at least a portion of the information that is displayable on the display by the display function in the first setting pattern is made non-displayable by the display function in the second setting pattern.

14. The method for operating a boat according to claim 8, wherein when at least two activation operations different from one another are executed, storing the changed setting pattern in association with each of the at least two activation operations.

* * * * *